No. 646,586. Patented Apr. 3, 1900.
J. H. SCHNEIDER.
PRICE SCALE.
(Application filed July 6, 1899.)
(No Model.)
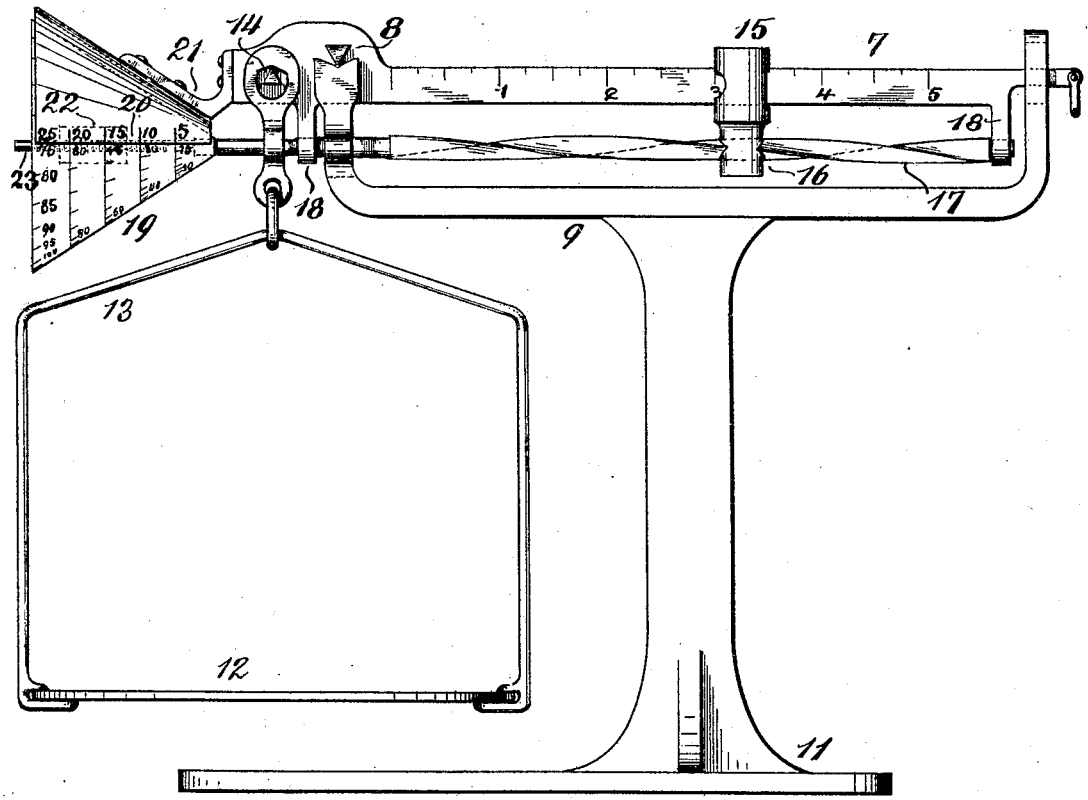
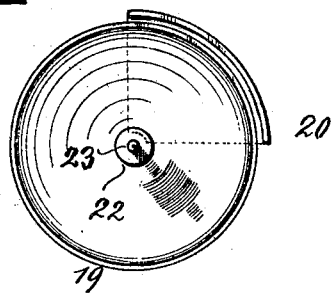
Attest
Fred Eggers
E. L. Giboney.
Inventor
John H. Schneider
by C. Spengel Atty

UNITED STATES PATENT OFFICE.

JOHN H. SCHNEIDER, OF NORWOOD, OHIO.

PRICE-SCALE.

SPECIFICATION forming part of Letters Patent No. 646,586, dated April 3, 1900.

Application filed July 6, 1899. Serial No. 722,920. (No model.)

*To all whom it may concern:*

Be it known that I, JOHN H. SCHNEIDER, a citizen of the United States, and a resident of Norwood, Hamilton county, State of Ohio, have invented certain new and useful Improvements in Price-Scales; and I do declare that the following is a description thereof sufficiently clear, full, and exact to enable others skilled in the art to which it appertains to make and use the same, attention being called to the accompanying drawings, with the reference-numerals marked thereon, which form a part of this specification.

This invention relates to improvements in scales provided with a sliding weight or poise and with an attachment which shows with the weight of an apportioned quantity of a certain article also at once the price of the quantity so weighed.

It relates also more particularly to such scales where these two results are had by obtaining only one of them directly, which may be either one, after which the other appears automatically and as a necessary consequence—that is to say, a scale as here outlined weighs either by weight or by money value to suit the particular form in which the demand is made for the sale of the goods. For instance, if one pound is wanted the poise is set to balance one pound, the attachment showing at the same time the price of it. If ten cents' worth is wanted, the poise is set to weigh ten cents' worth, the construction being such that the scale balances only at the correct weight to be given; but such weight is not considered nor does it appear in the transaction. The setting of the scale is done in each case by moving the poise and adjusting its position in conjunction with graduated scales, the one used in the first case showing weights and the one used in the second case showing money values, the two showings being dependent, however, on each other and appear always simultaneously.

My invention consists of the general construction and arrangement shown, whereby these results are obtained, and particularly of the construction and means used for indicating the money values.

In the following specification and particularly pointed out in the claims at the end thereof is found a full description of the invention, its operation, and manner of use, as well as its parts and construction, which latter is also illustrated in the accompanying drawings, in which—

Figure 1 shows in elevation a scale with my invention applied thereto. Fig. 2 is an end view of the upper part of the scale shown in the preceding figure.

This invention is applicable to scales using an adjustable weight in form of a sliding poise, and in this case it is shown in connection with a scale of the multiplying type as it is represented by the so-called "butchers'" or "market" scale.

In the drawings, 7 indicates the scale-beam, which is supported at 8 on a suitable frame 9, resting on a base 11. The platform or scale-pan 12 is carried by a frame 13 and supported on the short part of the scale-beam 7 at 14.

15 is the sliding poise mounted on the longer part of the scale-beam, which part is also graduated, the marks indicating pounds and fractions thereof. Poise 15 has a depending extension 16, whereby it engages a rod 17, disposed parallel to the scale-beam and supported in two bearings 18 18, depending from the latter near the ends thereof. The support of rod 17 is such as to permit it to rotate in its bearings, and its engagement to poise 15 through the medium of the extension thereof is such that a sliding movement of the poise produces such rotation. For such purpose the engaging parts are connected to a certain extent by a projection on one, received by a corresponding depression on the other, which may be a groove in the rod, for instance, and is disposed spirally around this latter, or it may be done, as shown, by using a rod which is otherwise than round and spirally twisted and by having the opening through extension 16 closely fitted around it. At one end of rod 17, as shown, I provide the value-indicator 19, being substantially a structure which presents sufficient surface to be capable of bearing marks and figures, the whole being arranged around the end of rod 17, to which end it is rigidly connected. It is preferably of cone shape, thereby turning its surface more fully toward the observer, permitting the marks and figures thereon to be readily perceived. It is now clear that any longitudinal movement of poise 15 causes cone 19 to rotate to an extent which bears a definite relation and is directly proportional to the extent of such movement by reason of the operative engagement of the parts. If cone 19 be provided with graduations, the change in position of any particular graduation is therefore equivalent to the change in position of the poise, as the same is indicated by the graduations on the scale-beam. As to cone 19, this change of position is read in conjunction with a stationary scale 20, suitably connected close to the cone—as, for instance, to the end of the scale-beam—a bracket 21 being used for such purpose. This scale is of extended width and fitted to the shape of cone 19, so as to cover a part of the surface thereof, thereby preventing confusion and rendering the figures wanted more conspicuous.

The operation of such a scale may now be readily understood. If, for instance, three pounds of a certain commodity are wanted, the poise is moved to figure "3" on the scale-beam, whereby the scale is set to weigh three pounds. This movement of poise 15 causes rotation of rod 17 and with it of cone 19, which latter now in conjunction with scale 20 shows the price of the particular quantity sold. If this price is five cents per pound, cone 19 will show the value of the quantity sold and weighed to be fifteen cents, the figure "15" appearing opposite the figure "5" on scale 20. If the demand is made in money value—for instance, fifteen cents' worth is wanted of a certain merchandise costing five cents per pound—the poise is simply moved until the figure "15" on cone 19 appears opposite the figure "5" on graduated scale 20 when the scale is set to balance and weigh a certain weight equivalent in value to fifteen cents' worth of the particular merchandise costing five cents per pound. This is weighing by money value altogether and is of particular advantage in weighing meats, which cannot always be cut exactly to a certain weight. When weighing in this manner, no attention is paid to the particular weight as indicated by the poise on the scale-beam, and the latter simply serves to balance the scale and to obtain by its sliding movement the requisite rotation of rod 17 and cone 19.

The customary adjusting and regulating weight 22 is mounted on an extension 23 of rod 17, which extension is screw-threaded, the whole being within the space surrounded by cone 19.

Having described my invention, I claim as new—

1. In a price-scale, the combination of a scale-beam 7 supported at 8 and comprising a longer and a shorter part, one to each side of its support, a sliding poise mounted on this longer part, which part is also graduated, a scale-pan supported on the shorter part, bearings 18 depending from the scale-beam, near the ends thereof, a rod 17 mounted therein and disposed parallel to the scale-beam and substantially of even length with this latter, a downward extension on poise 15, which engages rod 17, the engagement, in conjunction with the formation of the engaging parts, being such that adjustment of the poise on the scale-beam causes rotation of rod 17, a cone-shaped value-indicator 19, carried by rod 17, being secured to that end thereof, which is below the shorter part of the scale-beam and sharing the rotation of said rod, a graduated scale 20, operating in conjunction with value-indicator 19 and a bracket 21 securing it to the end of the shorter part of the scale-beam.

2. In a price-scale, the combination of a scale-beam 7, bearings 18 projecting therefrom, a twisted, rotary rod 17 supported thereon, a poise 15 adjustably mounted upon the scale-beam and operatively connected to rod 17 so that its longitudinal adjustment causes the latter to rotate a cone-shaped value-indicator 19 supported at one end of rod 17, with its wider part, which is open, directed outwardly, rod 17 being extended into the space surrounded by this cone, forming a screw-threaded extension 23 therein, an adjusting-weight 22 mounted on this extension and a graduated scale 20 showing prices, operating in conjunction with indicator 19 and supported stationary with reference thereto.

In testimony whereof I hereunto set my hand in presence of two witnesses.

JOHN H. SCHNEIDER.

Witnesses:
C. SPENGEL,
ERNEST G. SIMON.